Dec. 19, 1967  K. G. BECHEM  3,358,782
CUTTING ROLLER, IN PARTICULAR FOR ROLLER-TYPE ENLARGING BITS
Filed July 27, 1964  5 Sheets-Sheet 1
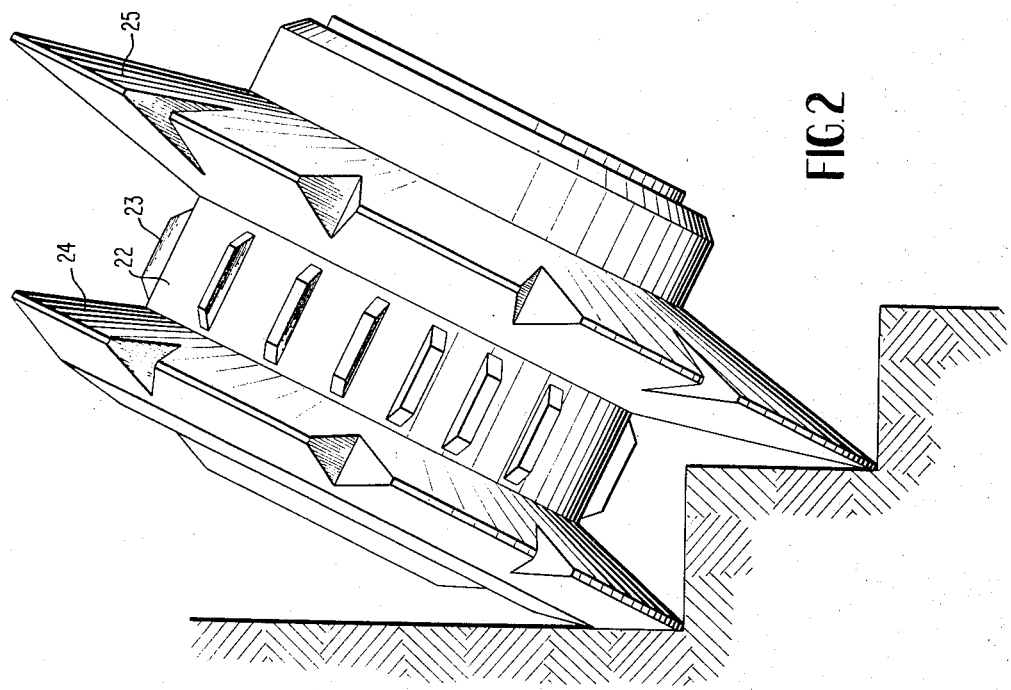
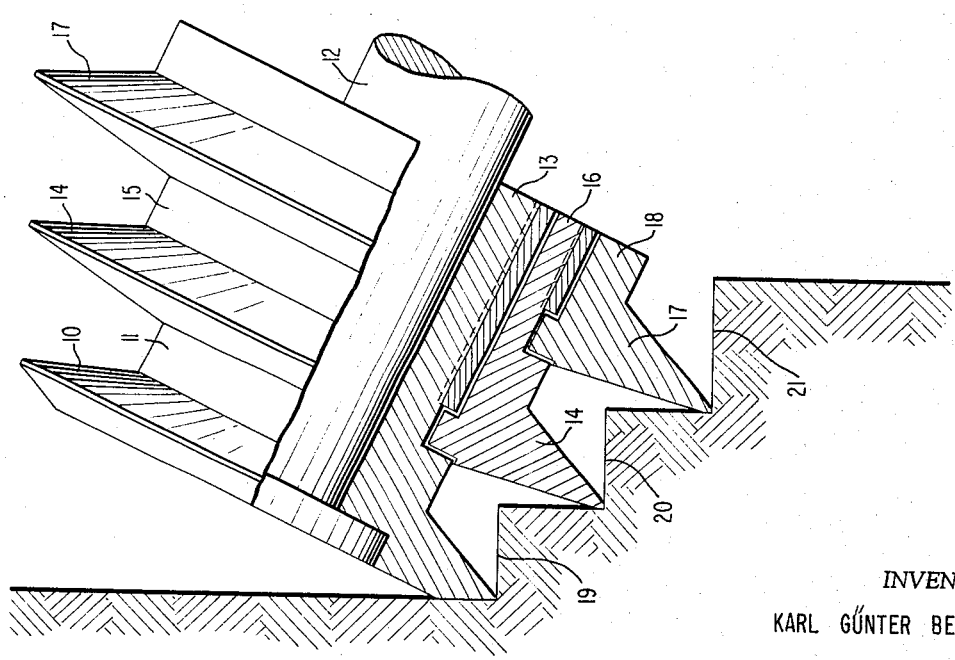
INVENTOR
KARL GÜNTER BECHEM Dec. 19, 1967  K. G. BECHEM  3,358,782
CUTTING ROLLER, IN PARTICULAR FOR ROLLER-TYPE ENLARGING BITS
Filed July 27, 1964  5 Sheets-Sheet 2
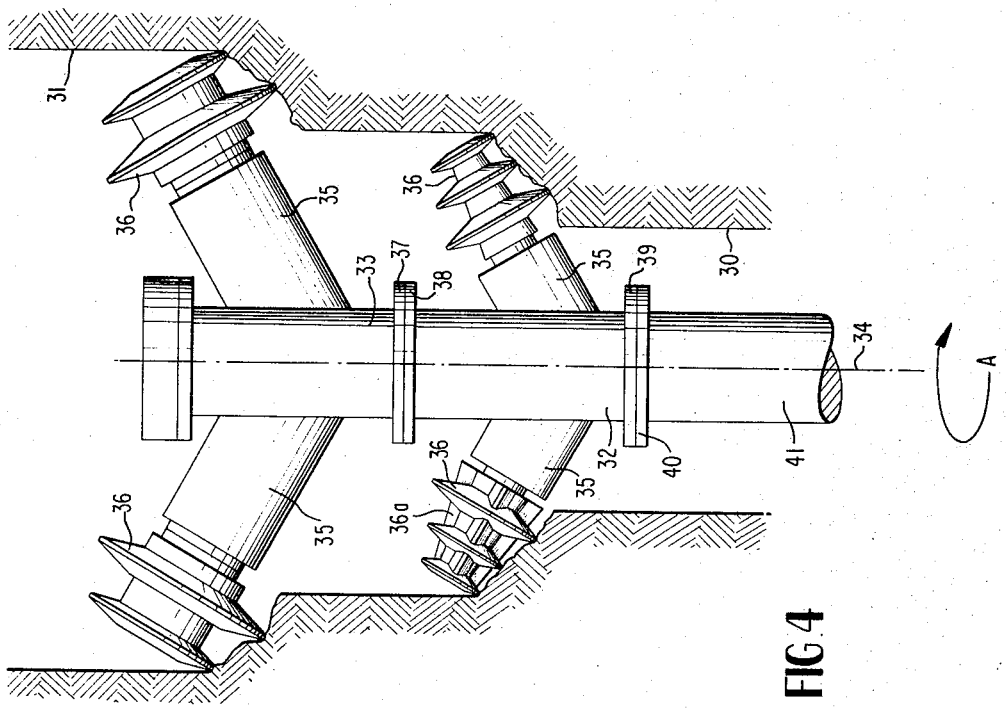
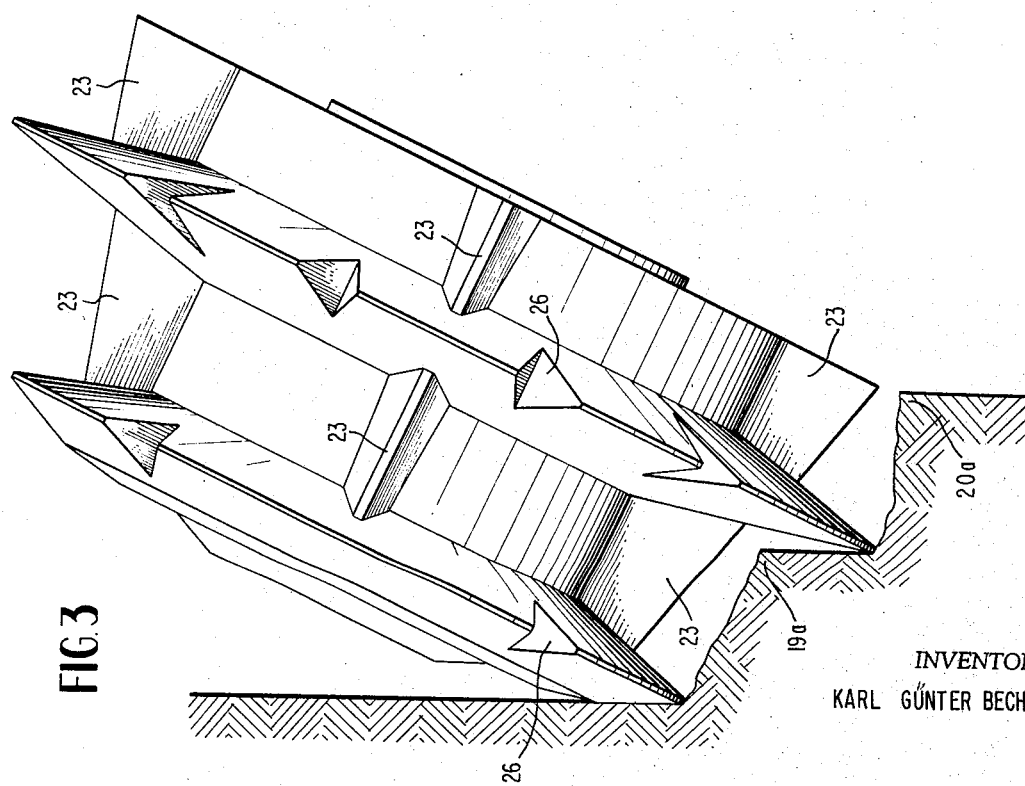
INVENTOR
KARL GÜNTER BECHEM Dec. 19, 1967   K. G. BECHEM   3,358,782
CUTTING ROLLER, IN PARTICULAR FOR ROLLER-TYPE ENLARGING BITS
Filed July 27, 1964   5 Sheets-Sheet 3
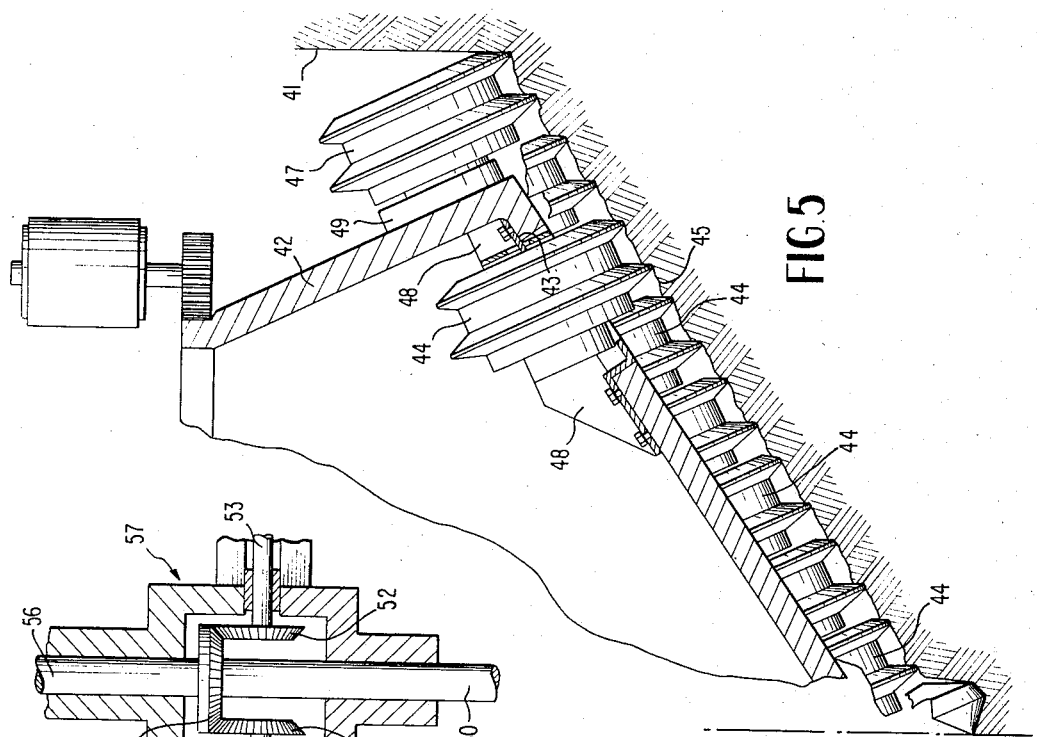
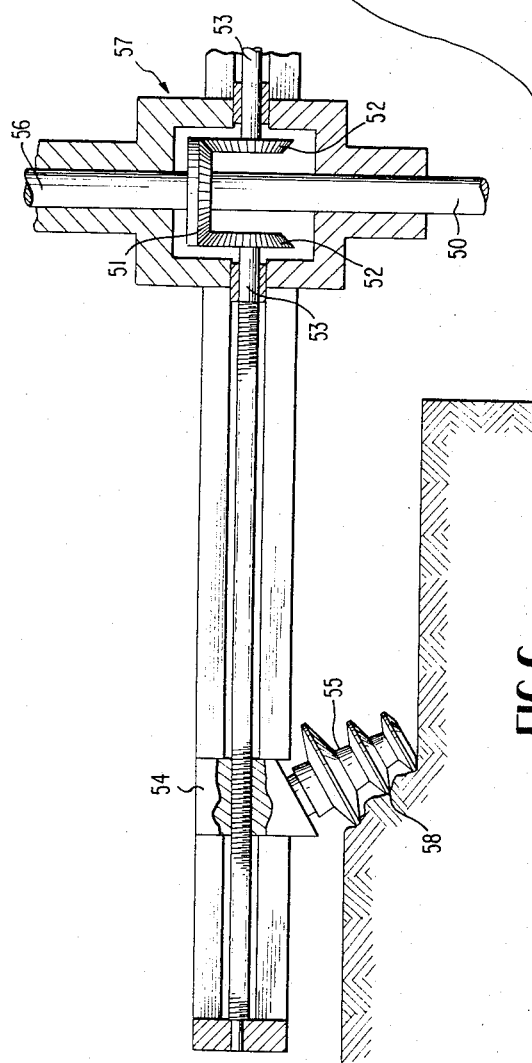
INVENTOR
KARL GÜNTER BECHEM

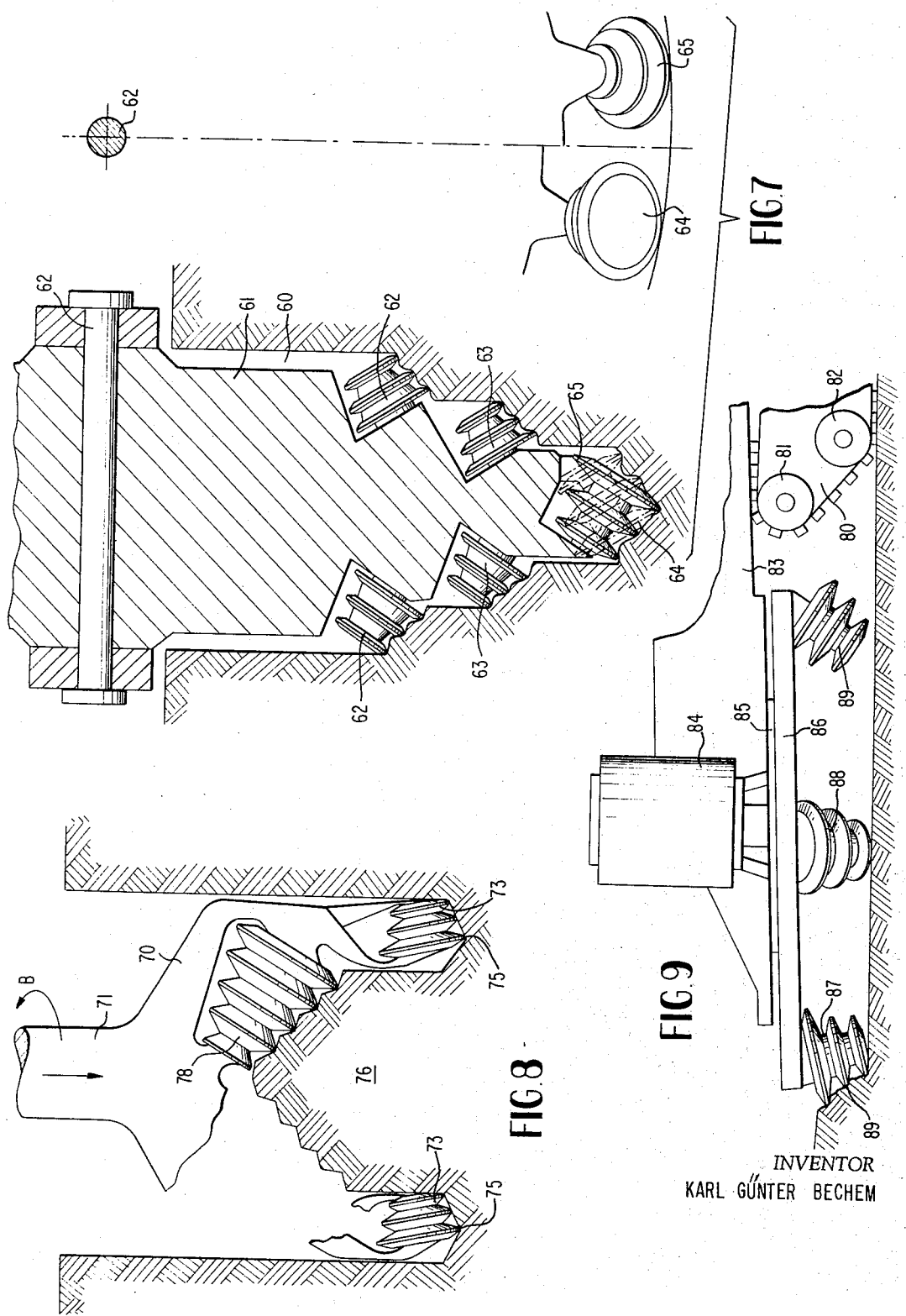

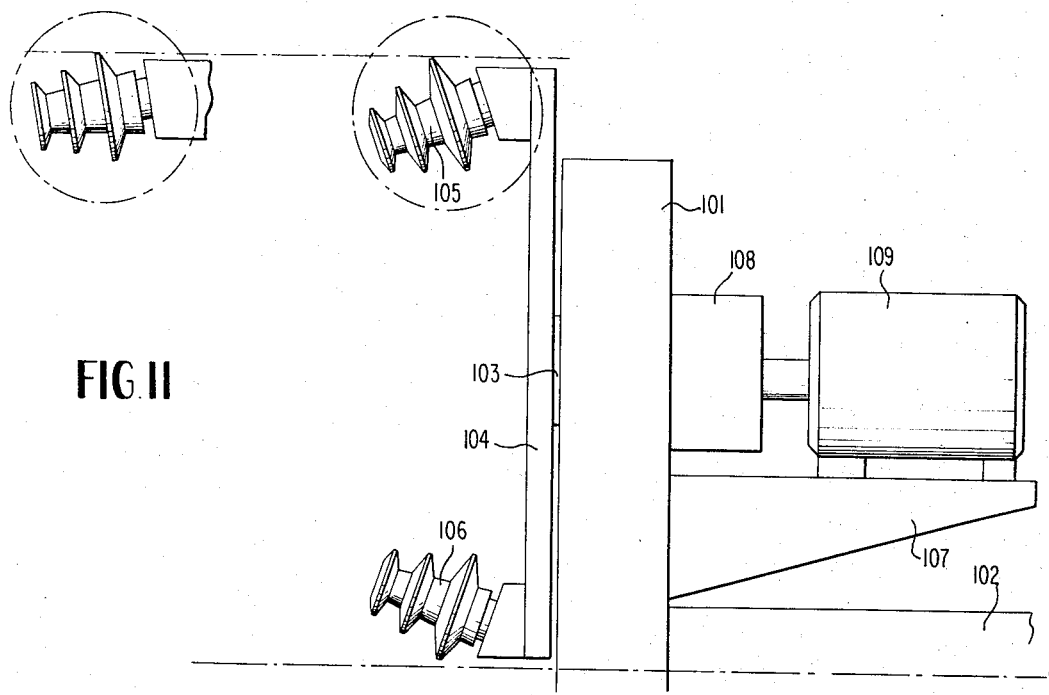
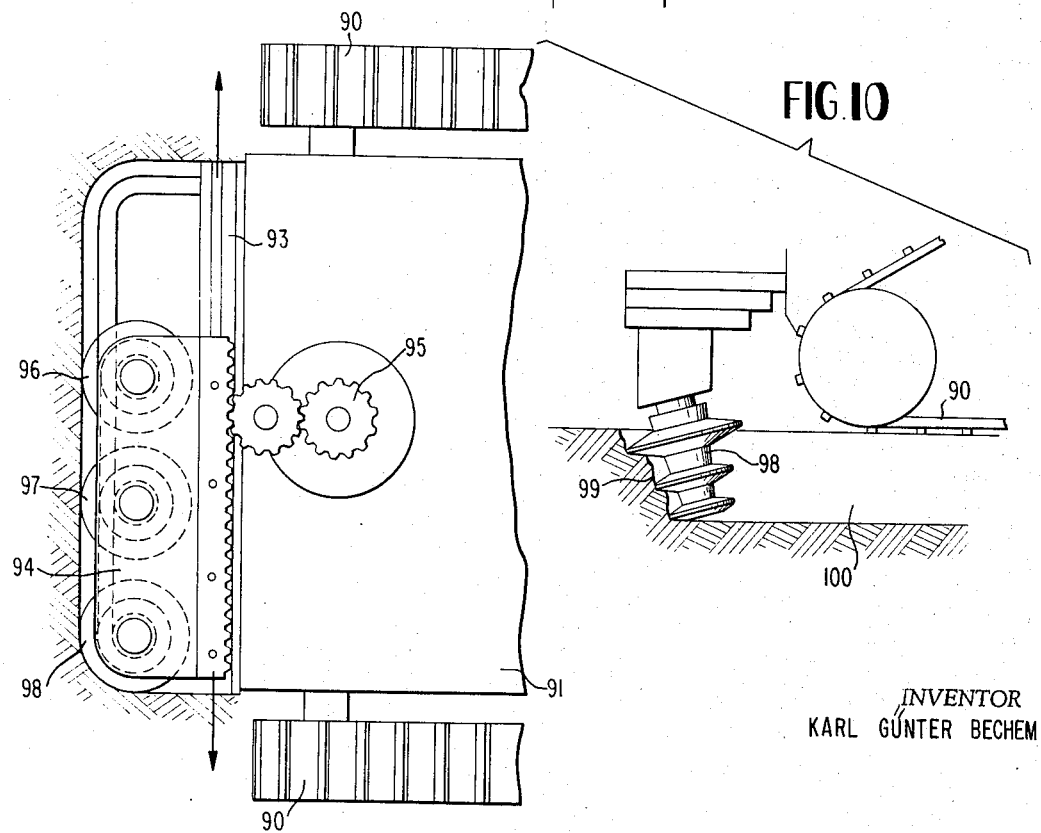

United States Patent Office 3,358,782
Patented Dec. 19, 1967

3,358,782
CUTTING ROLLER, IN PARTICULAR FOR ROLLER-TYPE ENLARGING BITS
Karl Günter Bechem, Tiefendorfer Weg, Hagen, Westphalia, Germany
Filed July 27, 1964, Ser. No. 385,424
Claims priority, application Germany, July 25, 1963, S 86,376
4 Claims. (Cl. 175—344)

The invention relates to a cutting roller, in particular for roller-type enlarging bits. Roller-type enlarging bits are known in which the rollers, which have a plurality of cutting ribs of wedge-shaped profile following one on the other at axial intervals, are mounted on spindles on the base body which extend in the form of a star and are inclined towards the trial bore hole, the base body being fixed on the drilling rods to be arranged in the trial bore. Cutting ribs of wedge-shaped profile are arranged on a conical base body tapering towards the axis of the bore hole at intervals preferably decreasing towards the said axis (German Patent specification 1,115,-662). It is intended to be possible to cut circular grooves by means of this roller-type enlarging bit in the annular base of the bore hole to be enlarged, and to break the undercut portions of the annular base away towards the trial bore through the wedge-shaped form of the cutting ribs.

In recognition of the fact that in this arrangement the operation of the individual cutting ribs from the outside towards the inside is impeded by the pressure of the material broken away by the respective outer cutting ribs and which is pressed against the following inner cutting ribs, it has already been proposed to provide a cutting rib of wedge-shaped profile on a substantially conical base body only at the outer larger base surface thereof and to employ the conical base body as an impact body which strikes against the undercut annular base and thereby so breaks up the undercut material that the latter can be carried away more easily by the action of the wedge.

Surprisingly, it has now been found that it is possible to operate very well with a plurality of successive cutting ribs, but it is then necessary to abandon the known principle which consists in that the diameters of the cutting ribs decrease with their distance from the free end of the roller.

The invention therefore consists in that, in fundamental contrast to this precept, the diameter of the cutting ribs increases with increasing distance from the free end of the roller.

It is true that it is already known (German Patent 851,333) to provide on an axle breaking rollers the diameter of which decreases with increasing distance from the axis of the bore hole, but in this case the reduction of the diameter with increasing distance from the axis of the bore hole is merely intended to produce different steps, so that the breaking rollers, which in fact do not undercut the base or bottom of the bore hole but only carry the rock away from it, do not impede one another. In the case of the object of the invention, on the other hand, a stepped formation of the base of the bore hole or of the surface to be removed is obtained as a result of the increase in the diameters of the cutting ribs with increasing distance from the free end of the roller, each individual cutting rib of the base body provided with a plurality of cutting ribs operating so to speak as a separate roller with a separate cutting rib and thereby in each instance automatically undercutting that section of the annular base of the bore hole or of the surface to be removed which is allocated to it and breaking it off away from the free end of the roller.

Preferably, impact surfaces equipped with impact bodies or ribs are provided between the successive cutting ribs, the said impact surfaces acting on the relevant rock surface and facilitating the breaking off and removal away from the free end of the roller. The cutting ribs may be mounted on separate axles concentric with one another which, with the exception of the axle for the outermost cutting rib, are in the form of hollow axles mounted on the said axle.

As a further development of the invention, the impact surfaces may be designed as rings formed on the cutting ribs and adapted in this way to be mounted with the cutting ribs on the bearing spindles.

The cutting ribs can be so arranged on the individual spindles that the cutting ribs on one spindle run in the gaps between the cutting ribs and the following spindle.

In order to obtain clean undercutting by the individual cutting ribs, the procedure adopted is that the outer boundaries of the individual cutting ribs preferably enclose an acute angle with the rock surface to be removed. At the same time, at least the outermost cutting rib is preferably so designed that its outer boundary extends precisely along the rock surface formed and a clean and smooth wall is thereby ensured.

The details, further features and other advantages will appear from the following description of a number of constructional forms and examples of application of the invention which is given with reference to the drawings, in which:

FIGURE 1 is a detail view, partly in section, of a cutting roller according to the invention to illustrate the arrangement of the cutting ribs on the spindles;

FIGURE 2 shows a preferred constructional form of the cutting roller according to the invention;

FIGURE 3 shows another constructional form of the cutting roller according to the invention;

FIGURE 4 illustrates the use of the cutting rollers according to the invention on a boring head which is pulled by means of drilling rods to widen a bore hole to a larger diameter;

FIGURE 5 shows a further application of cutting rollers according to the invention to a shield-like base body for the purpose of producing horizontal or vertical bores of larger diameter;

FIGURE 6 shows a drilling tool equipped with cutting rollers according to the invention for the stepwise enlargement of a bore, the enlargement taking place radially from the inside towards the outside;

FIGURE 7 shows a drifting tool employing cutting rollers according to the invention for producing a channel or trench;

FIGURE 8 shows another constructional form of a drifting tool employing cutting rollers according to the invention;

FIGURE 9 shows a rock removing machine, the head of which employs cutting rollers according to the invention;

FIGURE 10 shows another constructional form of the rock removing machine, this being illustrated in side view in the upper part of the drawing and in plan view in the lower part thereof; and FIGURE 11 shows a drifting machine operating with a rotary action and employing cutting rollers according to the invention.

The cutting roller illustrated in FIGURE 1 has an outer cutting rib 10 with a distance ring 11 formed thereon and located directly on a spindle 12. This cutting rib moreover has a sleeve portion 13 on to which the following cutting rib 14 with a spacing portion 15 formed thereon and a sleeve portion 16 is pushed. Another cutting rib 17 with a spacing portion formed thereon is pushed on to the sleeve portion 16.

It will clearly be seen that, owing to the diameters of the respective cutting ribs 10, 14, 17 which increase with increasing distance from the free end of the roller, the rock to be removed is cut in the form of steps, as illustrated at 19, 20, 21. The individual cutting ribs 10, 14, 17 cut into the rock behind the edge of the steps 19, 20 and 21, respectively, and hence, on further penetration, break the corresponding step portion off away from the free end of the roller without the broken-off rock impairing the action of the following cutting rib.

In the example of embodiment illustrated in FIGURE 2, the spacing portions 11, 15 and 18, as indicated at 22, are provided with impact bodies or projections 23. Of course, the individual cutting ribs 24, 25 may be provided with notches or with separate teeth, which latter, however, is not specially illustrated, but has the advantage that an impact effect occurs in addition.

The cutting ribs have notches which, as will be seen from FIGURE 2, are off-set with respect to one another in the peripheral direction in the individual cutting ribs. In this way the result is obtained that the contact pressure of the cutting roller acts substantially only on one of the cutting ribs.

The constructional form of the invention illustrated in FIGURE 3 differs from that according to FIGURE 2 in that the impact bodies or projections 23 are so increased in height that they can strike against the edges 19a, 20a and 21a, respectively, of steps formed in the rock by the cutting ribs. In this way, the annular teeth 27 formed by the notches 26 in the cutting ribs 10, 14, 17 are relieved of load and encounter more considerably loosened rock.

FIGURE 4 shows a boring head for enlarging an already produced bore hole 30 of comparatively small cross-section to the larger cross-section indicated at 31. The boring head itself is built up from two boring stages 32 and 33 and each boring stage carries cutting rollers 36 designed in accordance with the invention on a plurality of arms 35 which are preferably off-set through 120° with respect to the central axis 34 of the bore hole. On one of the arms 35 of the boring stage 32 there is shown a cutting roller 36 having teeth 36a located between its cutting ribs. These cutting teeth 36a correspond to the impact bodies as described above in connection with FIGURES 2 and 3. The two boring stages are connected by means of screws (not shown) by way of flanges 37, 38, while connection of the boring head is effected by means of a fixed flange 39 arranged on the boring stage 32 and which is likewise connected by means of screws (not shown) to a flange 40 at the end of a set of boring rods 41.

The set of boring rods 41 is composed in manner known per se of a plurality of lengths of boring rod which are screwed together, and is connected to a boring machine which sets the boring rods, and thereby the entire tool, in rotation in the direction of the arrow shown in FIGURE 4 and marked A. Moreover, the boring machine moves the rods 41 either with a pulling action, as shown, or with a pushing action, the boring rods being connected in the latter case to the flange 37a of the boring stage 33. As the boring machine and boring rods are known per se, they are not illustrated.

FIGURE 5 shows in section a shield-like boring head 42. The boring head 42 has apertures 43 through which the cutting rollers 44 according to the invention projects towards a working face 45. Each cutting roller 44 is mounted on an axle 45 which, in turn, is mounted at both ends in bearings 48 arranged on the shield 42, but which may have a spindle mounted on one side.

Owing to this arrangement, the cutting rollers according to the invention can be changed from the inside of the shield 42, so that the shield can remain in the position shown in the drawing and keeps the face 45 away from the interior space of the boring head 42.

Moreover, the shield-like boring head 42 carries on its periphery further cutting rollers 47 designed in accordance with the invention, the said cutting rollers being mounted in each case on one side in a bearing 49 on the outside of the head 42. If necessary, it is also possible to employ spindles stepped on both sides for the cutting rollers 47, as in the case of the cutting rollers 44. Of course, however, it is also possible to design the shield so that it continues as far as the wall of the bore hole 41. Once again, the boring head is driven in manner known per se and this is therefore not illustrated.

FIGURE 6 shows the enlargement of an already existing bore hole to a predetermined larger diameter. On a main boring shaft 50 there is mounted a bevel gear 51 meshing with another bevel gear 52 on each of two threaded shafts 53. On the thread of the shaft 53 there runs a nut-like body 54 on which the spindle of a cutting roller 55 designed in accordance with the invention is located in a bearing (not shown). If the shaft 50 is set in rotation, the threaded shaft 53 also turns and at the same time the cutting roller moves radially with respect to the bore hole. At the same time, by way of another shaft 56 the complete arrangement designated generally by the reference 57 is set in rotation, so that the boring tool rolls on the rock and thereby removes the layer of rock designated by the reference 58 with a splitting action into the free space of the widened bore hole. As soon as the boring tool 54 has reached the end of the outward travel rendered possible by the threaded shaft 53, the cutting roller 54 is carried back by reversing the direction of rotation of the bevel gears 51 and 52 and a fresh step is bored in the manner described. Of course, instead of the threaded mechanical shaft 53, it is also possible to provide a hydraulic or pneumatic feed.

Instead of using only one cutting roller, as shown in FIGURE 6, it is, of course, also possible to employ a plurality of cutting rollers which are arranged stepwise.

FIGURE 7 shows a working head of a machine for producing a channel or trench 60. On a carrier 61, starting from a swing axle 62 of the carrier, cutting rollers 62 and 63 according to the invention are mounted at outwardly increasing distances from the central axis of the carrier 61. Two boring tools 64 and 65 having their axes inclined with respect to one another are provided at the outermost end of the carrier 61, the said boring tools pre-working a relatively narrow channel which is wedge-shaped in cross-section, as can be seen from FIGURE 7 of the drawing. The carrier 61 can perform an oscillating movement about the axle 62, but can also be moved to and fro by apparatus, for example a running gear (not shown), so as to penetrate gradually deeper into the rock in order to produce a cable or pipe trench, which is illustrated in cross-section in FIGURE 7.

The boring or drifting machine illustrated in FIGURE 8 also makes use of a wedge-shaped channel as illustrated at the bottom of FIGURE 7 and produced by the boring tools 64 and 65.

According to FIGURE 8, boring rods 71 are connected to the boring head 70 and are set in rotation with a pressing or pushing action in the manner described in connection with FIGURE 4, as indicated by way of example in FIGURE 8 by the arrows B.

Mounted on the boring body 70 at the periphery thereof are two boring tools 73 having their axes inclined in relation to one another as can be seen from FIGURE 8 and which therefore drive the wedge-shaped annular channel 75. In this way, a rock remnant 76 of somewhat conical form in cross-section is formed and is removed by means of further cutting rollers 78 according to the invention which are arranged in the boring tool 70.

The advantage of this arrangement consists in that the rock is loosened up in the region of the remnant 76, so that even very hard rock can be removed easily.

By way of departure from the constructional form of the invention illustrated in FIGURE 8, the boring head 70 can also be operated with an oscillating or reciprocating action in the manner described in connection with FIGURE 7, so that instead of an annular channel two channels which are wedge-shaped in cross-section and enclose the rock remnant 76 between them are formed separately. This can also be achieved by the part 71 forming the spoke of a wheel, so that a circular movement is obtained. This also applies to the arrangement according to FIGURE 7.

The rock removing machine illustrated in FIGURE 9 is mounted, according to the example of embodiment shown, on a tracked running gear 80, the caterpillar track, only part of which is shown, being carried over guide rollers 81 and 82. On the machine there is mounted a main frame 83 on which a drive 84 is mounted. The drive 84 acts on a shaft 85 which sets a carrier 86 in rotary movement. Cutting rollers 87, 88 and 89 designed in accordance with the invention are arranged, preferably at equal intervals, on the carrier 86. As the machine advances and the shaft 85 is set in rotation in the direction indicated in FIGURE 9 by the arrow, the rock is carried away along the step designated by the reference 89.

Instead of the fixed mounting of the cutting rollers illustrated in FIGURE 9, the radially displaceable mounting shown in FIGURE 6 may also be employed. One particular field of application of such a machine is, for example, the removal of a road surface, the widening of sunken roads and the like road-building operations. Of course, instead of only one step, a plurality of such steps can be removed simultaneously by suitably staggering the cutting rollers.

Two views of another rock removing machine are shown in FIGURE 10. This rock removing machine is mounted on a support 91 which, according to the example of embodiment illustrated, is again in the form of a tracked running gear 90. The support carries at its front guide rails 93 along which a drifting tool 94 is mounted to be movable with a reciprocating action, as indicated in the lower part of FIGURE 10 by the arrows. The drive 95 serves to drive the drifting tool 94. According to the example of embodiment illustrated, the drifting tool 94 carries three cutting rollers 96, 97 and 98 designed in accordance with the invention. As will be seen, as the machine illustrated in FIGURE 10 is advanced in the direction indicated by the arrow in the upper part of FIGURE 10, it removes the outcropping rock along the step designated by the reference 99. During this process, the tracked running gear 91 rests on the edge of the trench-shaped cut 100 produced in this way.

FIGURE 11 shows, to such extent as is necessary for understanding the invention, a section of the drifting tool of a drifting machine known per se, which has essentially a main base body 101. The main base body is set in rotation by way of the central shaft 102. A plurality of rotary carriers 104 are mounted in the main base body 101 on shafts 103 and carry on their peripheries cutting rollers 105 and 106 designed in accordance with the invention. Fundamentally speaking, there may be any desired number of cutting rollers on the carriers 104, but at least three of these cutting rollers are preferably employed. The carrier 104 is set in rotation by way of a gearing 105 by means of a motor 106. The motor 106 is mounted on a bracket 107 which in turn is fixedly mounted on the main base body 101. In contrast to the example of embodiment illustrated, the shaft 103 may also be inclined with respect to the shaft 102.

The left-hand part of FIGURE 11 shows another constructional form of the cutting rollers 105 and 106 in which the cutting ribs are chamfered only on one side.

The arrangements indicated in the examples of embodiment described have become possible for the first time owing to the method of operation of the cutting rollers according to the invention which has been described above in detail, since the cutting rollers according to the invention operate with a splitting action and yield a rock material the pieces of which are comparatively large, but can in any case be adjusted in size. In this way the crushing action of the previously known cutting rollers which would make machines of the type described impossible from the start because of their exceptional expenditure of work and consumption of power, is eliminated.

Of course, the invention is not limited to the examples of embodiment illustrated in the drawings and described hereinbefore in detail, but modifications can be made therein without departing from the basic idea of the invention. Thus, for example, it is possible to drive and/or activate the cutting rollers individually or in groups and this can preferably be effected with piston-type impact devices or unbalance drives.

I claim:

1. A roller-type enlarging bit for forming a substantially stepped cut along a generally conical cutting face on a wall of a pilot opening, comprising a boring rod, at least one axle having an inner end portion mounted on said boring rod and an outer end portion disposed radially outward of said rod and terminating in a free end, and a plurality of individual annular cutting ribs mounted at axial intervals for rotating about the outer end portion of said axle adjacent the free end thereof, the diameter of said ribs increasing with increasing distance away from the free end of said axle, the radially outward extent from said rod of the outermost cutting rib being greater than that of the free end of the axle.

2. A roller-type enlarging bit for forming a substantially stepped cut along a generally conical cutting face on a wall of a pilot opening, comprising a boring rod, at least one axle having an inner end portion mounted on said boring rod and an outer end portion disposed radially outward of said rod and terminating in a free end, and a plurality of individual annular cutting ribs mounted at axial intervals for rotation about the outer end portion of said axle, the diameter of said ribs increasing with increasing distance away from the free end of said axle, said cutting ribs being mounted on separate sleeves which are concentric with one another.

3. The invention according to claim 2, and impact ribs disposed between successive ones of said cutting ribs on at least one of said sleeves.

4. A roller-type enlarging bit for forming a substantially stepped cut along a generally conical cutting face on a wall of a pilot opening, comprising a boring rod, at least one arm having an inner end portion mounted on said boring rod and an outer end portion disposed radially outward of said rod, a carrier mounted on said arm for movement therealong, an axle having an inner end mounted on said carrier and an outer end portion extending outwardly from said carrier and terminating in a free end, and a plurality of individual annular cutting ribs mounted at axial intervals for rotation about the outer end portion of said axle, the diameter of said ribs increasing with increasing distance away from the free end of said axle, and means for moving said carrier along said arm.

References Cited

UNITED STATES PATENTS

| | | | |
|---|---|---|---|
| 17,650 | 6/1857 | Wilson | 175—334 X |
| 223,230 | 1/1880 | Jenkins | 155—352 |
| 334,595 | 1/1886 | Maloy | 175—352 |
| 1,733,311 | 10/1929 | McNeill | 175—344 X |
| 2,310,289 | 2/1943 | Hokanson | 175—378 X |
| 2,482,263 | 9/1949 | Goodwin | 175—378 X |
| 2,533,260 | 12/1950 | Woods | 175—341 |
| 2,759,706 | 8/1956 | Peter | 175—378 |
| 3,170,524 | 2/1965 | Trosken | 175—344 X |
| 3,215,214 | 11/1965 | Caro | 175—344 X |

CHARLES E. O'CONNELL, *Primary Examiner.*

NILES C. BYERS, *Assistant Examiner.*